United States Patent

Daebler

[15] 3,693,229

[45] Sept. 26, 1972

[54] CANNED TRANSISTOR-IC LEAD BENDER

[72] Inventor: Donald H. Daebler, Cedar Rapids, Iowa

[73] Assignee: Collins Radio Company, Dallas, Tex.

[22] Filed: Dec. 16, 1970

[21] Appl. No.: 98,529

[52] U.S. Cl. ................................................29/203 B

[51] Int. Cl. ..............................................H01r 43/00

[58] Field of Search ..29/203 B, 203 D, 203 H, 203 P

[56] References Cited

UNITED STATES PATENTS

| | | | |
|---|---|---|---|
| 3,121,282 | 2/1964 | Donee | 29/206 |
| 3,136,040 | 6/1964 | Bauer et al. | 29/203 H |
| 3,321,825 | 5/1967 | Cooke | 29/203 P |

*Primary Examiner*—Thomas H. Eager

*Attorney*—Warren H. Kintzinger and Robert J. Crawford

[57] ABSTRACT

A lead bending tool for uniform tight forming of leads about a canned circuit can for upside down mounting of the canned circuit on a planar circuit board. The tool includes a canned circuit holding die member and a relatively moveable tool lead bending assembly with a conical surfaced member for engaging and radially deflecting leads, and a cylindrical die wire bending member that receives the conical surfaced member in a telescoping action during lead bending and that with continued lead bending movement moves into radially aligned overlap about a die annular rim of the canned circuit holding die member in completing a lead bend forming stroke.

17 Claims, 9 Drawing Figures

Figure 1:
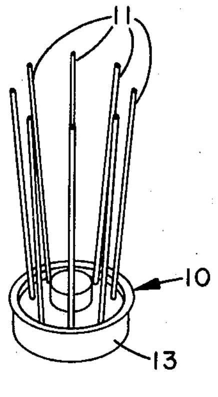

INVENTOR
DONALD H. DAEBLER

BY Warren H. Kintzinger
ATTORNEY

INVENTOR
DONALD H. DAEBLER

BY Warren H. Kintzinger
ATTORNEY

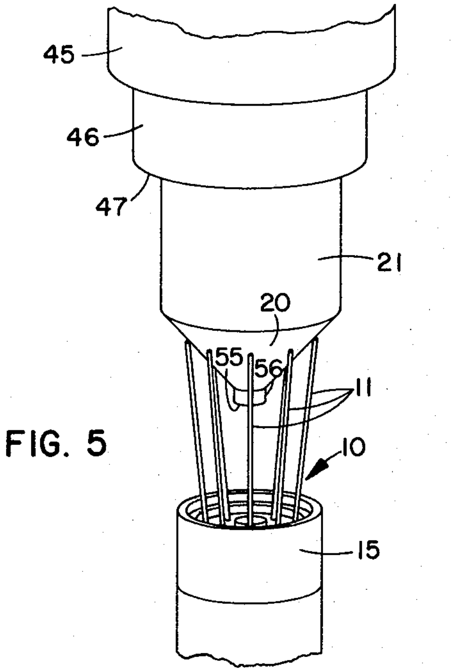
FIG. 5
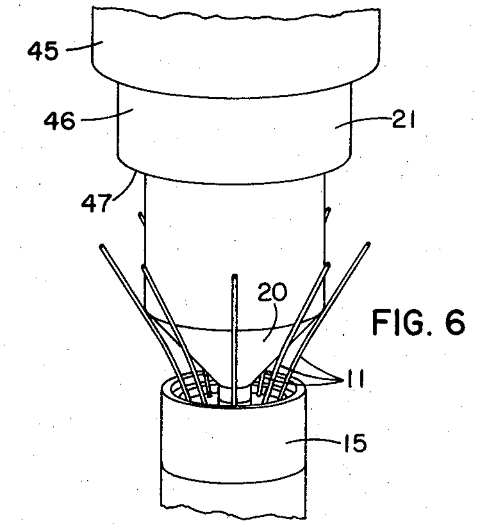
FIG. 6
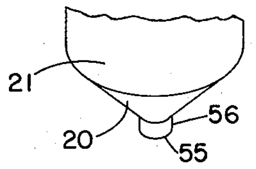
FIG. 8
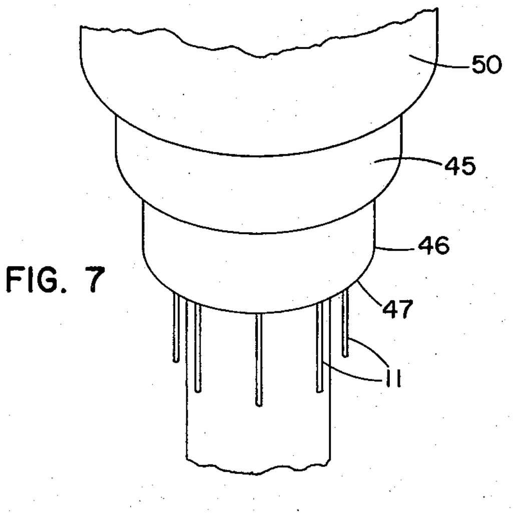
FIG. 7
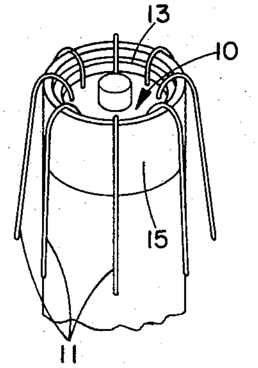
INVENTOR
DONALD H. DAEBLER
BY Warren H. Kintzinger
ATTORNEY INVENTOR
DONALD H. DAEBLER
BY Warren H. Kintzinger
ATTORNEY

CANNED TRANSISTOR-IC LEAD BENDER

This invention relates in general to the bending of canned transistor — IC circuit leads for reverse (upside down) mounting to a circuit board, and in particular, to an IC circuit lead bender tool capable of canned circuit lead bending to a high degree of uniformity.

In order to mount IC canned circuits to a circuit board in upside down fashion, a canned circuit mounting orientation highly desired for ease of factory test and field maintenance testing, can potted circuit external leads must be bent substantially 180° degrees. This must be accomplished, without lead shorting contact with the IC or transistor circuit containing can and if done by hand it is a tedious time consuming job. Further, such manual bending with pliers of canned IC or transistor circuit leads, usually approximately some eight to ten leads, results in lead ends not being uniform in end positioning nor in pattern orientation. This nonuniformity in lead end positioning along with lead end pattern disorientation certainly is not conducive to automatic soldering such as wave soldering of circuit leads inserted through a circuit board. Still further, another problem encountered is that the leads of some of the IC canned circuits are relatively short imposing a requirement that the individual relatively short leads be bent tightly very close to the IC can to maximize the lead length available for insertion through a circuit board in order to optimize utilization of automatic wave soldering of circuit boards. With such IC canned circuit relatively short leads, when they are being bent by hand, it is pretty hard to get such degree of tight bends in close adjacency to the circuit can such as to make it difficult, in many cases even impossible, to get all the leads to come through the circuit board such as to be suitable for automatic wave soldering of such circuit boards. Furthermore, some of the canned IC or transistor circuits would fall off the boards they were to be mounted on prior to the wave soldering operation with, as a result, production costs being excessive.

It is, therefore, a principal object of this invention to provide for simultaneous tool bending and forming of all the leads of a canned transistor — IC circuit for facilitating reverse upside down mounting of such canned circuits to a circuit board.

Another object is to provide substantially uniform bending of all leads from a canned transistor — IC circuit to substantially uniform end positioning and desired pattern orientation.

A further object with such bending of leads from canned transistor — IC circuits is ease of insertion of leads through a circuit board and to facilitate reverse side wave soldering of the leads to circuit boards mounting the canned circuits.

Still another object is to attain uniform tight bends in leads in close adjacency to the circuit can to optimize upside down mounting of canned circuit units with relatively short leads.

Features of the invention useful in accomplishing the above objects include, in a canned transistor — IC circuit lead bending tool, a transistor — IC canned circuit unit holding bottom die with a center canned circuit unit receiving recess and a surrounding elevated annular rim. The tool includes a downward moveable upper assembly mounted in alignment with the bottom die and having a truncated conical member terminated at the lower end with a flattened bottom canned circuit engaging extension and terminated at the upper end in a cylindrical shank. As the downward moveable upper assembly is lowered, by hand operation, the conical surface of the truncated conical member engages canned circuit lead ends and with continued downward movement simultaneously radially progressively forms the leads outwardly. This is continued until the flattened bottom of the conical member comes into pressure contact, backed by an internal resilient compressible spring structure within the upper moveable assembly, with the center bottom of the canned circuit unit held upside down in the bottom die. The downward movement of the upper moveable assembly is continued with a cylindrical sleeve being brought into contact with the leads and in further downward movement bends the leads about the elevated annular rim of the canned circuit unit holding bottom die. With this further downward lead bending movement of the downward moveable upper assembly, the conical member telescopes therewithin and then after each wire lead bending stroke a spring return structure returns the upper assembly to the lead prebending elevated state. A canned circuit unit eject assembly is used for ease of removal of each circuit unit used for ease of removal of each circuit unit after each canned circuit lead bending cycle.

A specific embodiment representing what is presently regarded as the best mode of carrying out the invention is illustrated in the accompanying drawings.

Figure 2:
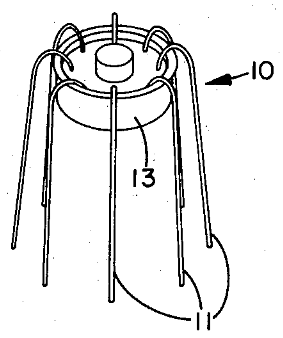
Figure 3:
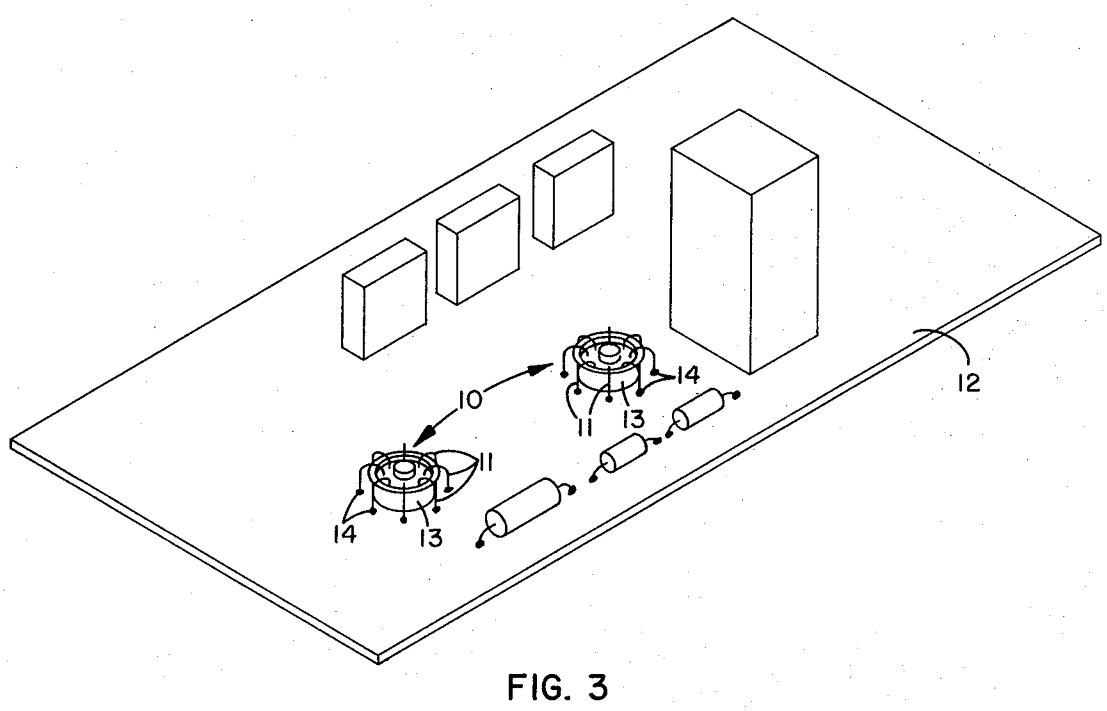
Figure 4:
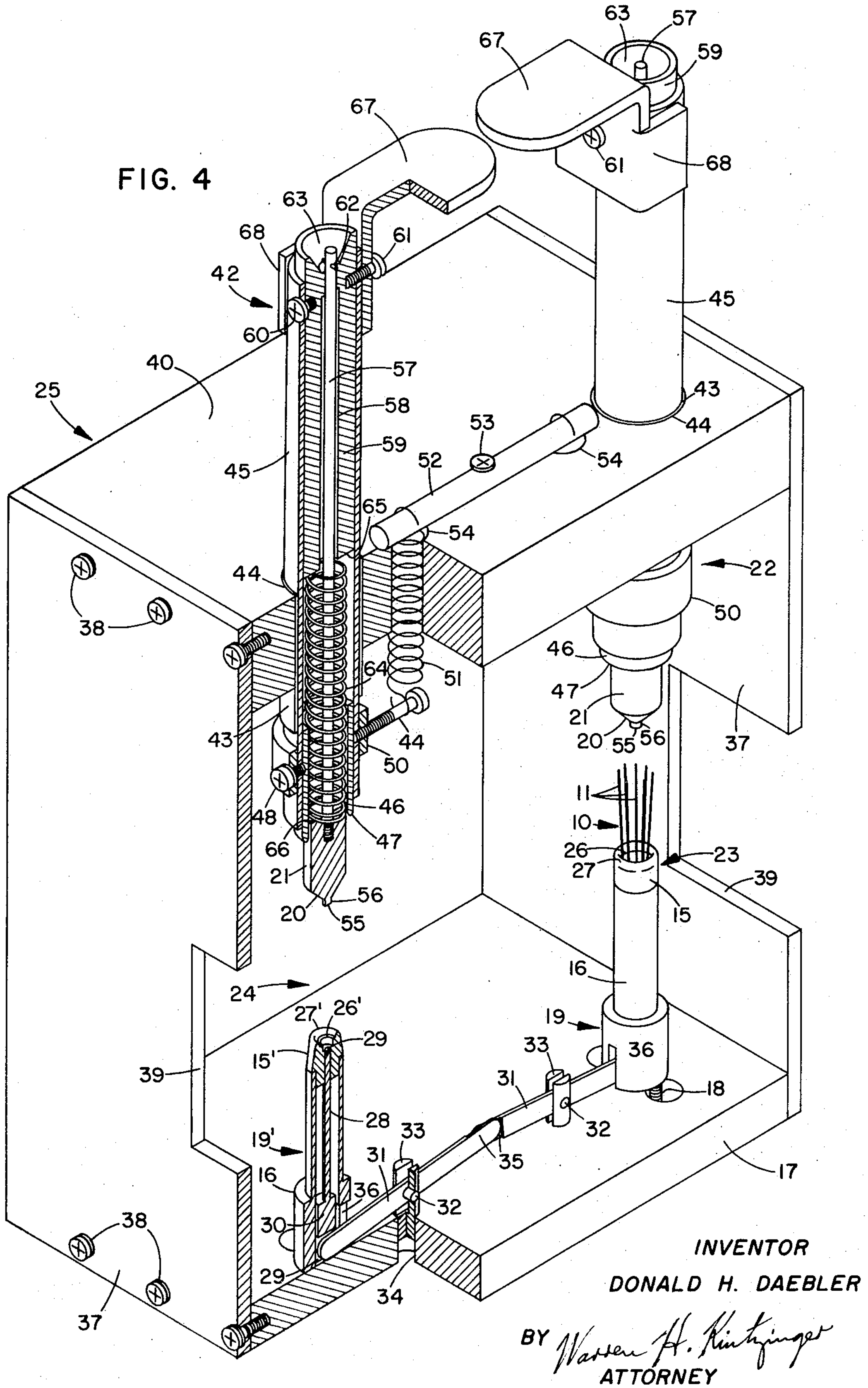
Figure 9:
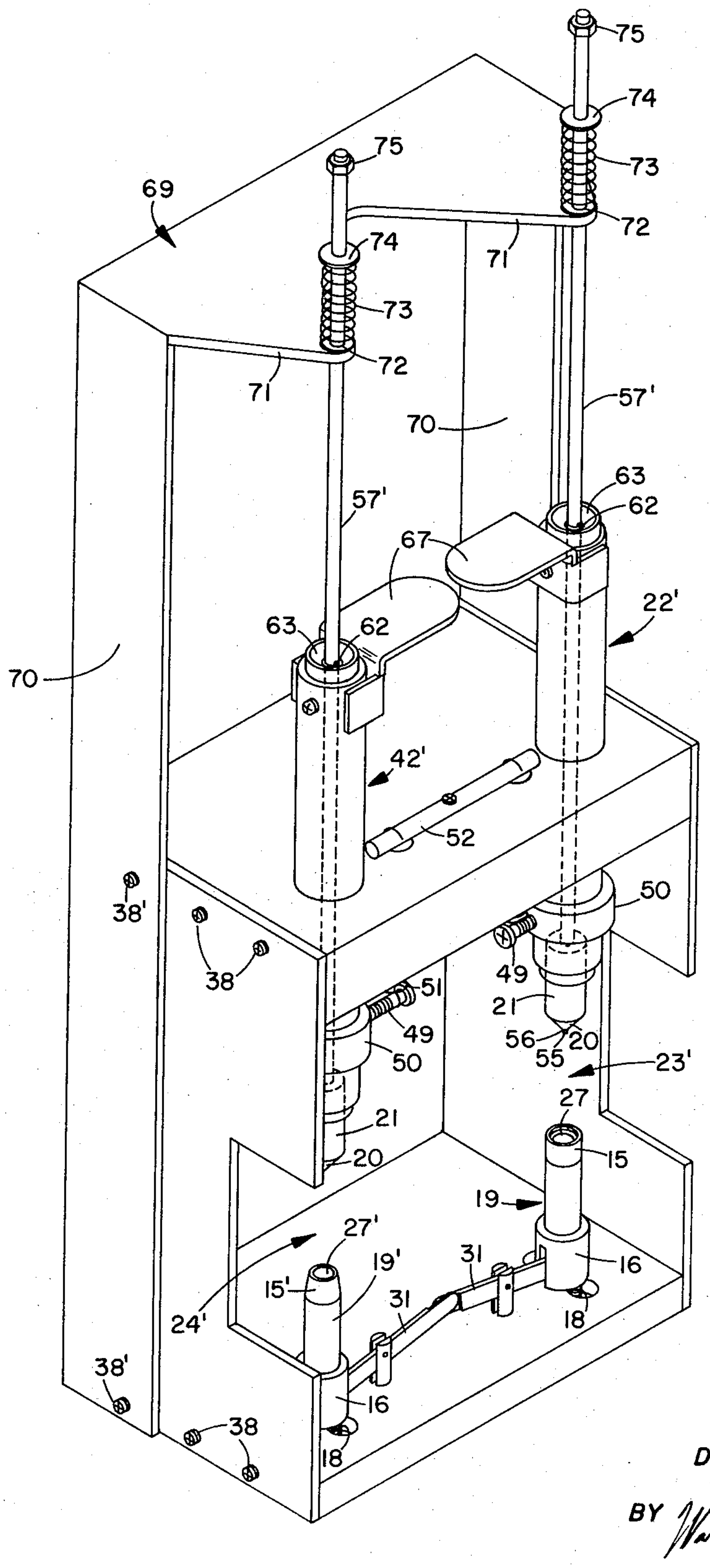

In the drawings:

FIG. 1 represents a perspective view of a transistor — IC canned circuit unit with the leads extended from the canned circuit unit bottom in the prebent state;

FIG. 2, a perspective view of a transistor — IC canned circuit unit after the leads have been tool bent for upside down mounting on a circuit board;

FIG. 3, a perspective view of a circuit board with mounted components thereon including upside down mounted canned circuit units;

FIG. 4, a partially cutaway and sectioned perspective view of a two unit side-by-side canned circuit lead bending tool with two different size IC canned circuit tool holder lead benders, and the tool eject mechanism;

FIG. 5, a partial perspective view showing early lead contact and lead radial bending deflection with downward movement of a bending tool conical element;

FIG. 6, a partial perspective view with the leads further radially deflective bent from the state of FIG. 5 and the conical tool element in its bottom stroke position with a flattened bottom end center extension resting on the center of the canned circuit unit held upside down in a bottom support and die unit;

FIG. 7, a partial perspective view with a lead bending sleeve in descended lead bending position around the annular rim of a bottom die cylindrical base;

FIG. 8, a partial perspective view of a canned circuit unit still held in a bottom die cylindrical base after lead bending ready for removal as facilitated by ejection mechanism; and FIG. 9, a perspective view of a two unit side-by-side canned circuit lead bending tool such as shown by FIG. 4 with conical tool element to canned circuit unit bearing contact pressure limiting structure added.

Referring to the drawings:

The transistor — IC canned circuit unit 10, of FIG. 1, is initially equipped with a plurality of spider like leads 11 that are substantially uniformly tool bent to the state of FIG. 2. This is to facilitate upside down mounting of such transistor canned circuit units 10 on circuit boards 12 that may mount other components as shown in FIG. 3, with the cans 13 of the canned circuits in contact directly with circuit board 12, or on an intervening pad layer (not shown), with the leads 11 projecting through circuit board plated through holes 14 (or other board holes) and solder circuit connected as by wave soldering on the bottom side of the board 12.

Referring now to FIG. 4, a transistor — IC canned circuit unit 10 is in place upside down in a bottom canned circuit holding support and die unit 15 mounted on bottom die mount member 16 that is fastened to tool base plate 17 by alignment adjustable position fastening structure 18 in a tool bottom die assembly 19. This is with wire leads 11 in position to be engaged by the conical surface 20 of truncated conical member 21 of the downward moveable upper tool assembly 22 of a two unit 23 and 24 side-by-side canned circuit lead bending tool 25. The primary differences in the canned circuit lead bending tool unit 24 from tool unit 23 reside in differences found in bottom canned circuit holding support and die unit 15' with this die unit designed for receiving smaller size transistor — IC canned circuit units than the units 10 with tool unit 23. With the canned circuit lead bending tool units 23 and 24, those portions substantially the same carry the same numbers as a matter of convenience and those that are a little different will be given primed numbers in unit 24 with only the unit 24 being cutaway and sectioned in order to illustrate internal detail that generally is common to both units 23 and 24.

The support and die unit 15 is provided with an upper center recessed transistor — IC canned circuit receiving well opening 26 within which canned circuit units 10 of a predetermined size are placed with leads 11 projecting upwardly therefrom to ultimately be formed down over and around lead bending die rim 27 of die unit 15 that is shaped with an outer vertical cylindrical surface in mating alignment with the adjacent cylindrical portion of bottom die mount member 16. With the tool unit 24, bottom canned circuit holding support and die unit 15' of tool bottom die assembly 19' is equipped with a much smaller transistor — IC canned circuit unit recessed well opening 26' with an upper wire lead bending die rim 27' much smaller than the opening 26 and rim 27 structure of bottom die assembly 19 in tool unit 23. This is with the bottom die unit 15' having a sloped conical extension from the die rim 27' to a mating transition end with the adjacent cylindrical portion of bottom die mount member 16 of tool bottom die assembly 19'. Please note, that the tool bottom die assemblies 19 and 19' are each equipped, as shown, with the tool bottom die assembly 19', with center eject pin 28 guide opening 29 for facilitating the removal of transistor — IC canned circuit units placed in the canned circuit holding support and die units 15 and 15' after each lead tool forming operational cycle. Each eject pin is formed with an enlarged slotted 29 base 30 that receives, within the slot 29, the outer actuating end of an eject lever 31 that is pivotally mounted by a pivot pin 32 in a pivot post 33 mounted in an opening 34 in base 17. This is with the eject levers 31 each having overlapping thinned ends 35, and outer ends projecting through clearance slots 36 of the respective bottom die mount members 16 in order that the levers 31 may be simultaneously manually manipulated for upward ejection movement of the pins 28 to thereby facilitate simultaneous removal of transistor — IC canned circuit units that have been simultaneously wire lead tool form bent processed in the respective tool units 23 and 24 of side-by-side canned circuit lead bending tool 25.

The two tool unit side-by-side canned circuit lead bending tool structure 25 includes opposite side plates 37 fastened by screws 38 to opposite side edges of base plate 17 and top plate 40. The opposite side plates 37 are also provided with cutouts 39 to facilitate upside down placements of transistor — IC canned circuit units in bottom canned circuit holding support and die units 15 and 15' for lead forming and subsequent removal thereof after each lead bend forming cycle. Top plate 40 mounts downward moveable upper assembly sections 22 and 42 of canned circuit lead bending tool units 23 and 24 with guide bearing sleeves 43 pressed in place in openings 44 of the top plate 40. The bearing guide sleeves 43 provide guided alignment for upward and downward relative movement therethrough of the tubes 45 of moveable upper assemblies 22 and 42. Please note, that the moveable upper assemblies 22 and 42 are substantially duplicates of each other so, in effect, description with respect to one is equally applicable to both. In each of these upper assemblies 22 and 42, a cylindrical wire bending die member 46 is fixed in place within the lower end of the tube 45 with the die wire bending annular rim 47 thereof projected below the lower end of the tube 45. Cylindrical wire bending die member 46 is mounted with screws 48 and 49 locking it in place within the tube 45 and the screws 48 and 49 also projecting through an assembly return limit position collar 50. The upper edge of collar 50 limits upward movement of the upper assembly 22 or 42 by abutting engagement with the lower end of the respective sleeve 43. This is an effective upward position limiting structure with respect to upward movement return as resiliently urged by a return spring 51 interconnecting the respective screw 49 and a return spring retaining rod 52 mounted on top plate 40 by screw 53 and with the springs 51 projecting through top plate openings 54.

Each of the upper assemblies 22 and 42 support a truncated conical member 21 with a cylindrical body supported for relative longitudinal telescoping movement of the truncated conical member 21 whenever the flattened bottom end 55 of the center projection 56 is brought into bearing engagement against the center bottom of a canned circuit unit held in a bottom canned circuit holding support and die unit 15 or 15'. Each truncated conical tool member 21 is supported in its upper assembly 22 or 42 by a center pin 57 that is threaded into the top of the truncated tool member 21, at the bottom end of the center pin, and with the center pin 57 substantially the same length as the cylinder 45 projecting through a center opening 58 of a cylindrical spring reaction member 59 fixed in position within cylinder 45 by screws 60 and 61. A pin 62 through the top of center pin 57 rests on the bottom of spring reaction member top recess 63 to hold the pin 57 and thereby the truncated tool member 21 from movement out of the cylinder 45 and the cylindrical wire bending die member 46. The resiliently compressible spring 64, confined within tube 45 about center pin 57 and between the bottom end 65 of spring reaction member 59 and the top surface 66 of truncated tool member 21, provides resiliently maintained canned circuit bottom engaging force when the downward moveable assembly 22 or 42 is lowered to, and lower than, the position with the bottom surface 55 of extension 56 of truncated member 21 in engagement with a canned circuit held by the bottom tool die unit 15 or 15'. It does so through the continued downward movement of the assembly with the truncated tool member 21 therewith progressively withdrawn in telescoping action within the cylindrical wire bending die member 46 with continued downward movement thereof for completed tool bending of the wire leads 11 of a canned circuit unit in each lead bending cycle operation of the tool.

A manually manipulated handle 67 with a mounting yoke 68 is mounted on each of the sleeves 45 of the upper tool assemblies 22 and 42 with the handles of the respective assemblies 22 and 42 disposed towards each other to facilitate simultaneous operation of both upper tool assemblies 22 and 42 by one hand throughout the downward canned circuit lead bending movement operation thereof. With such tool bending cyclic operation, each of the upper tool assemblies 22 and 42 are so lowered that the truncated conical surface 20 of truncated conical members 21 are brought into initial radial deflecting wire lead 11 engaging state, such as shown in FIG. 5, and progressively to the further wire 11 deflected state, shown in FIG. 6, with the wire leads 11 extending beyond and engaging the outer peripheral base edge of the truncated surface 20 in position for engagement by the lower lead tool bending rim edge 47 of cylindrical die member 46. This is brought about with continuing downward movement of the upper assemblies 22 and 42 with continued manual pressure on the handles 67 and with telescoping of the truncated tool member 21 within the cylindrical wire bending die member 46 the lower die wire bending annular rim 47 is brought into contact with the wires 11. Thereafter with continued downward movement thereof, the wire leads 11 are formed downwardly within the cylindrical die member 46, as shown in FIG. 7, so that ultimately with withdrawal of the upper assembly 22 or 42 and raising of the truncated connical member 21, the wire leads of a canned circuit unit are uniformly tool bent, as shown in FIG. 8.

With the two unit 23' and 24' side-by-side canned circuit lead bending tool 25', of FIG. 9, most components are the same as with the lead bending tool 25, of FIG. 4, with, however, a canned circuit truncated tool 21 force limiting structure added including top elongated center pins 57' with the top elongations extending to and through a bracket addition 69 with opposite side depending frame walls 70 mounted in overlying relation to side plates 37 with screws 38'. This bracket addition overstructure 69 includes two ears 71 in general overlying alignment with the respective upper assemblies 22' and 42' and the center pins 57' extend through ear openings 72 and including coil springs 73 with top washers 74 and an end nut 75 on each of the upper ends of center rods 57'. Thus, when the upper assemblies 22' and 42' are lowered to extension 56 bottom surface 55 contact, of the truncated tool members 21, with canned circuits held by the lower tool assemblies 19 and 19' the nuts 75 engage the washers 74 and resiliently compress springs 73 thereby lessening the net unit area pressure loading of truncated members 21 exerted on the canned circuit units being wire lead bend formed.

Whereas this invention is herein illustrated and described with respect to several embodiments hereof, it should be realized that the various changes may be made without departing from essential contributions to the art made by the teachings hereof.

I claim:

1. In a canned circuit lead bending tool for facilitating the upside down mounting of canned circuit units on planar circuit boards and in other circuit environments using such upside down mountings: a canned circuit unit holding die with a center canned circuit unit receiving recess for receiving canned circuit units with leads extending outward and away from said canned circuit unit holding die; said canned circuit unit holding die including a surrounding annular rim about said center canned circuit unit receiving recess; a canned circuit lead bending tool assembly including a conical surfaced lead engaging tool member, and a cylindrical wire bending die member with a wire bending annular rim about said conical surfaced lead engaging tool member and supporting said conical surfaced lead engaging tool member for telescoping movement thereof within said cylindrical wire bending die member; means mounting said canned circuit lead bending tool assembly in alignment with said canned circuit unit holding die; and means for guided aligned movement of said canned circuit lead bending tool assembly toward and away from said canned circuit unit holding die; travel limiting means limiting movement of said conical surfaced lead engaging tool member toward said canned circuit unit holding die; resilient means in said canned circuit lead bending tool assembly exerting force on and through said conical surfaced lead engaging tool member; and actuating means for repeated canned circuit lead bending cycles of operation of the canned circuit lead bending tool.

2. In a canned circuit lead bending tool for facilitating the upside down mounting of canned circuit units on planar circuit boards and in other circuit environments using such upside down mountings: a canned circuit unit holding bottom die with a center canned circuit unit receiving recess for receiving upside down oriented canned circuit units; said bottom die including a surrounding elevated annular rim about said center canned circuit unit receiving recess; bottom die mounting means; a downward moveable upper canned circuit lead bending tool assembly including a conical surfaced lead engaging tool member, and a cylindrical wire bending die member with a wire bending annular rim about said conical surfaced lead engaging tool member and supporting said conical surfaced lead engaging tool member for telescoping movement thereof within said cylindrical wire bending die member; frame means connected to said bottom die mounting means and mounting said downward moveable upper canned circuit lead bending tool assembly in alignment with said bottom die and including guide bearing means for guided aligned movement of said upper tool assembly toward and away from said bottom die; travel limit means limiting movement of said conical surfaced lead engaging tool member toward said bottom die; resilient means in said upper tool assembly exerting force on and through said conical surfaced lead engaging tool member; and upper tool assembly actuating means for repeated canned circuit lead bending cycles of operation of the canned circuit lead bending tool.

3. The canned circuit lead bending tool of claim 2, wherein said conical surfaced lead engaging tool member includes, a truncated conical surface, a cylindrical shank, and a center flat bottom surface; and said travel limiting means is engagement of said center flat bottom surface with the body of a canned circuit unit held by said bottom die.

4. The canned circuit lead bending tool of claim 3, wherein said center flat bottom surface is on an extension from the center bottom of said truncated conical surface of said conical surfaced lead engaging tool member.

5. The canned circuit lead bending tool of claim 3, wherein said surrounding elevated annular rim about said center canned circuit unit receiving recess is of sufficient height more than the thickness of canned circuit unit can bodies seated in said receiving recess that leads form bent down over said surrounding elevated annular rim do not make contact with the can of the canned circuit unit being lead tool bent processed.

6. The canned circuit lead bending tool of claim 5, wherein said cylindrical wire bending die member has an internal diameter greater than the outside diameter of the surrounding annular rim of said canned circuit unit holding die; and that, with continued lead bending movement of said canned circuit lead bending tool assembly and said cylindrical wire bending die member said wire bending annular rim moves into radially aligned overlap about said elevated annular rim of said canned circuit unit holding bottom die.

7. The canned circuit lead bending tool of claim 6, wherein said resilient means in said upper canned circuit lead bending tool assembly is resiliently compressible spring means confined within said upper tool assembly.

8. The canned circuit lead bending tool of claim 7, wherein resilient spring return means for upper tool assembly lead bending cycle return interconnects said upper tool assembly and said frame means.

9. The canned circuit lead bending tool of claim 7, wherein canned circuit lead bent processed unit eject means is included with said canned circuit unit holding bottom die.

10. The canned circuit lead bending tool of claim 9, wherein said eject means includes an eject pin slidably contained in a hole extended to said center canned circuit unit receiving recess in said bottom die; and eject pin actuating movement means mounted on said bottom die mounting means.

11. The canned circuit lead bending tool of claim 10, wherein said eject pin actuating movement means is a lever pivotally mounted by a pivot pin structure on said bottom die mounting means.

12. The canned circuit lead bending tool of claim 11, wherein said bottom die mounting means includes a bottom plate, a mounting base for said bottom die, and alignment base to plate adjustable position fastening means.

13. The canned circuit lead bending tool of claim 11, wherein said upper tool assembly actuating means comprises a handle mounted to said upper tool assembly for manual manipulation.

14. The canned circuit lead bending tool of claim 13, wherein said frame means includes an upper tool assembly mounting plate; said guide bearing means is a bearing material sleeve positioned in an opening of said upper tool assembly mounting plate; and with a cylindrical tube of the upper tool assembly a sliding fit in said bearing material sleeve.

15. The canned circuit lead bending tool of claim 14, wherein stop means is provided for said conical surfaced lead engaging tool member in the form of a center pin fastened to the top of said conical surfaced tool member; said center pin extends through said upper tool assembly; and position limit means fastened to said center pin engageable with said upper tool assembly limiting downward movement of said conical surfaced lead engaging tool member relative to said upper tool assembly.

16. The canned circuit lead bending tool of claim 15, wherein two of said tools are mounted in the same frame mounting assembly; with manually manipulated handles directed toward each other; and with eject pin levers directed toward each other for simultaneous tool actuation and simultaneous canned circuit eject from the tools.

17. The canned circuit lead bending tool of claim 15, wherein canned circuit unit body tool engaging force limiting means includes a bracket extension above said upper plate; extension of said center pin to and through an opening in said bracket extension; and resilient means engaging said bracket extension and said center pin exerting downward movement resistive force on said center pin as the center pin and the conical surfaced tool member approach their operative lower limit position.

* * * * *